C. FOWNES.
Fastening for Tea Kettle Covers.
No. 53,290.
Patented March 20, 1866.
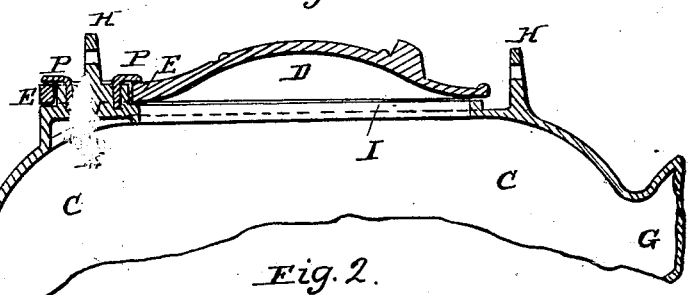
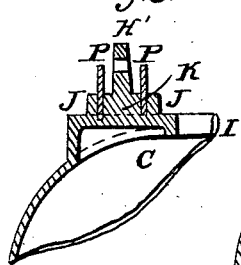
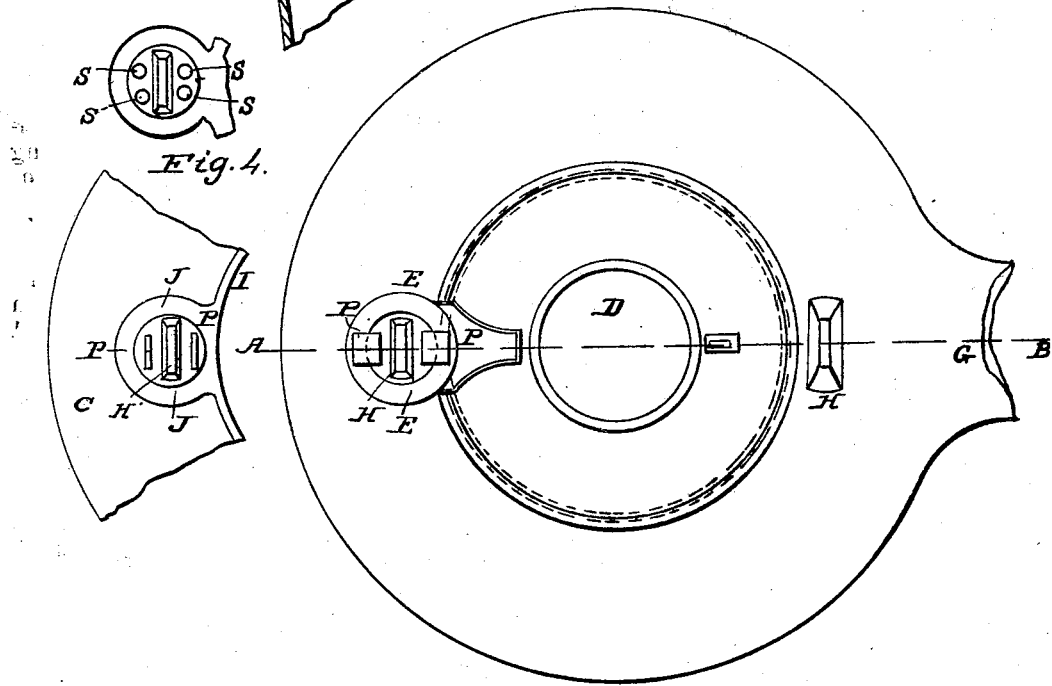

UNITED STATES PATENT OFFICE.

CHARLES FOWNES, OF PITTSBURG, PENNSYLVANIA.

FASTENING FOR TEA-KETTLE COVERS.

Specification forming part of Letters Patent No. 53,290, dated March 20, 1866.

*To all whom it may concern:*

Be it known that I, CHARLES FOWNES, of the city of Pittsburg, in the county of Allegheny and State of Pennsylvania, have invented a new and Improved Fastening for Tea-Kettle Lids; and I do hereby declare that the following is a full and exact description thereof, reference being had to the accompanying drawings, and to the letters of reference marked thereon, in which—

Figure 1 is a side view, in section, through the line A B. Fig. 2 is a plan or top view. Fig. 3 is a side view, in section, through the line A B of the kettle before the lid is put on, and Fig. 4 is a top view of the kettle before the lid is put on.

My invention consists in an improved fastening for tea-kettle lids, by which it is rendered quite secure in a cheap and neat manner, and without preventing the handle of the kettle being fastened to the tea-kettle in the usual manner, thereby making a stronger handle.

To enable others skilled in the art to make and use my invention, I will proceed to describe its construction and operation.

C is the body of the tea-kettle. D is the lid. E is the ring, cast solid with the lid D. G is the spout of the tea-kettle. H H' are the two ears with holes for fastening the handle. I is the rim of the tea-kettle. J is a circular ledge to receive the ring E of the lid D. K is a circular projection or disk, which fits in the ring E of the lid, and around which said ring and lid revolve. The ledge J, disk K, and ear H' are all cast solid and of one piece with the body of the tea-kettle. P P are two small pieces of flat, soft iron, which are cast in and chilled in the metal of the disk K, and stand in the position indicated by Figs. 3 and 4 before the lid is put on, and are bent down and stand in the position represented in Figs. 1 and 2 after the lid is put on, and the tea-kettle is finished.

Instead of the two pieces P P, four pieces of wire or round pieces, S S S S, can be used, and either that wire or the flat pieces P P can be made of copper or brass instead of soft iron, and yet answer the same purpose.

The pieces P P are placed in the mold when the tea-kettle is to be cast, and they are chilled and firmly united in the metal of the main body of the tea-kettle, standing in the position represented in Figs. 3 and 4. The ring E of the lid D is slipped over the knob or disk K until it rests in the groove J and bears all over on the rim I. The pieces P P, which are made of soft, good iron well annealed or of copper or brass, are now bent down and flattened, so as to form two hooks, in the manner represented in section in Fig. 1 and in plan in Fig. 2, and the lid is permanently fastened to the kettle without the aid of screws, rivets, bolts or pins.

What I claim as my invention, and desire to secure by Letters Patent of the United States, is—

1. The two flat pieces P P, or their equivalent, used for the purpose specified.

2. The combination of the disk K, ear or lug H', and ledge J (cast all of one piece with the body of the kettle) with the pieces P P.

3. Securing the lids of tea-kettles by the hooks formed by bending over the ring E pieces of soft metal cast or chilled in the disk K, in the manner and for the purposes specified.

CHARLES FOWNES. [L. S.]

Witnesses:
 H. P. GENGEMBRE,
 WM. A. MCCLELLAND.